United States Patent Office 3,119,862
Patented Jan. 28, 1964

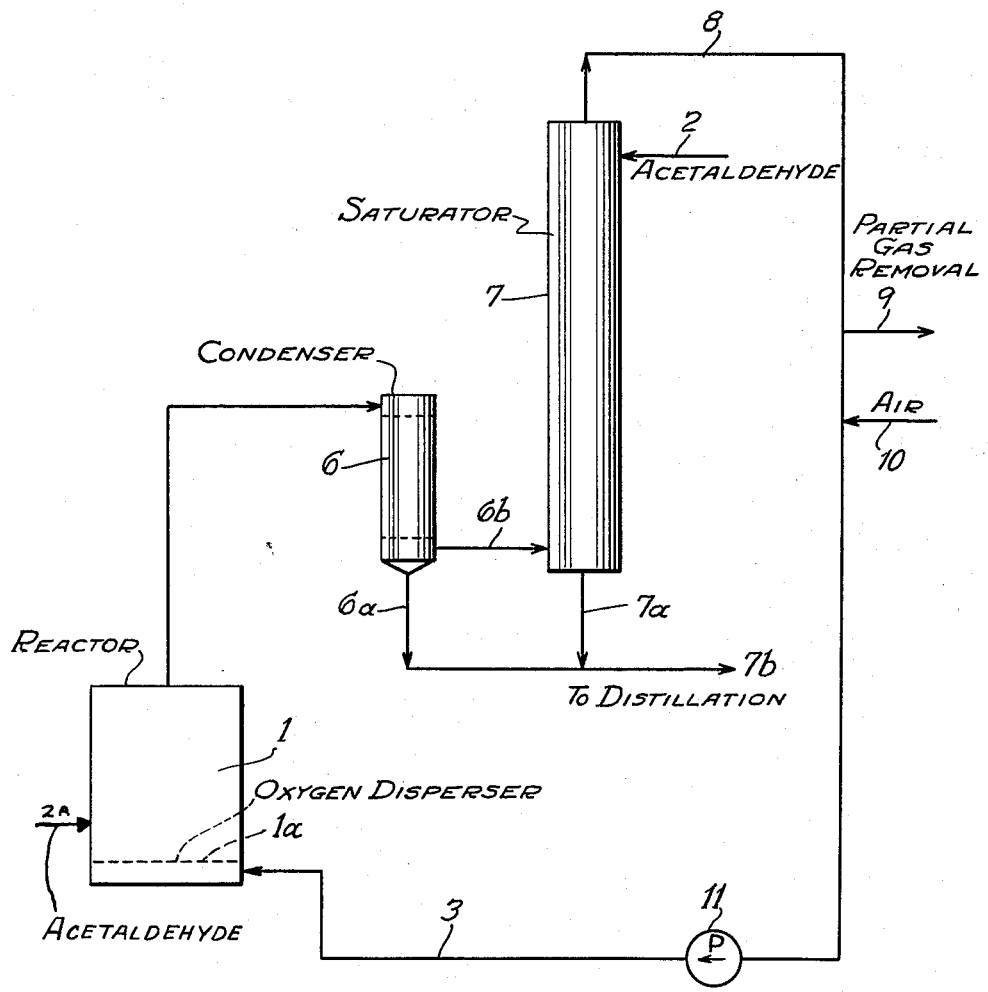

3,119,862
PROCESS FOR PRODUCING ACETIC ANHYDRIDE
Louis Alhéritière, Melle, Deux-Sevres, France, assignor to Les Usines de Melle (Societe Anonyme), Deux-Sevres, France, a corporation of France
Filed Dec. 13, 1960, Ser. No. 75,621
Claims priority, application France Dec. 22, 1959
4 Claims. (Cl. 260—546)

This invention relates to a process for producing anhydride.

It is known that acetaldehyde can be converted by oxidation into acetic acid and acetic anhydride by introducing an oxygen-containing gas into and through a liquid reaction bath consisting mainly of a mixture of acetic acid and anhydride and containing dissolved therein suitable metal acetates acting as aldehyde oxidation catalyst, more particularly cobalt and copper acetates. The acetaldehyde is introduced and oxidized in liquid phase in the reaction bath.

The residual oxygen-containing gases leaving the bath draw off and entrain as vapors the acetic acid, acetic anhydride and water produced by the oxidation reaction. These gases and vapors are subjected to cooling for condensing the entrained reaction products, which are then subjected to distillation. Actual practice has shown that for obtaining a high proportion of acetic anhydride it is necessary to cool the gaseous mixture to a temperature not substantially above 10° C. Then the residual gases are recycled to the reaction vessel by means of a fan after discarding of a fraction of said gases and replacement of this fraction by fresh oxygen-containing gas. Where no cooling water at a sufficiently low temperature is available, it has been necessary to pass the gaseous fluids issuing from the water-cooled condenser through an additional, brine-cooled condenser to cool them to about 10° C. or below.

The present invention has for an object an improvement which permits performing this additional cooling without expense for removing calories from the gas stream.

The invention accordingly comprises the novel processes and steps of processes specific embodiments of which are described hereinafter by way of example, and in accordance with which I now prefer to practice the invention.

In carrying out the invention acetaldehyde and air are introduced into a liquid reaction bath containing an acetaldehyde oxidation catalyst. The acetaldehyde and air are ordinarily introduced in the form of a gas-vapor mixture, and the acetaldehyde may be supplemented by a feed of liquid actaldehyde made directly to the bath. The bath consists essentially of a mixture of acetic anhydride and acetic acid, as well as the acetaldehyde oxidation catalyst. This catalyst may be a salt such as copper acetate or cobalt acetate, or a mixture thereof. The catalyst may also consist of a salt or salts such as the nitrates, acetates or chlorides of silver, nickel, manganese, vanadium, mercury, tin or uranium.

The reaction is an exothermic reaction, and a gas-vapor mixture is liberated from the bath. It contains acetic anhydride and acetic acid along with any excess oxygen, acetaldehyde and water. In order to recover the acetic anhydride it is necessary to condense the mixture. In accordance with my invention I condense the mixture by dispersing acetaldehyde particles therein to lower the temperature of the mixture. This may be conveniently done by spraying liquid acetaldehyde into the mixture, or by conducting the mixture into a zone into which liquid acetaldehyde is introduced and is broken up by a medium such as Raschig rings contained therein. This dispersed acetaldehyde lowers the temperature of the mixture and condenses it. Partial condensation whether achieved by spraying or dispersion of acetaldehyde occurs. The condensate containing the anhydride, acetic acid and acetaldehyde may then be passed to a distillation apparatus where the anhydride and other components may be separated. The uncondensed portion of the gas-vapor mixture saturated with acetaldehyde and containing residual oxygen is then supplied with further oxygen and passed to the reaction bath.

In accordance with this invention, the acetaldehyde to be converted is introduced, in liquid condition, into the gas cycle, at a point between the gas outlet of the reaction vessel and the residual gas discarding point, so that the acetaldehyde vaporizes within the gaseous stream, thus taking off the required amount of calories from said gaseous stream. The temperature of the gaseous stream decreases accordingly, causing condensation of the vapors of acetic anhydride, acetic acid and water still contained therein.

It is recommended to introduce the liquid acetaldehyde in divided state in the gaseous stream or to cause it to become divided in the gas stream. For this purpose the liquid acetaldehyde may, for example, be sprayed within a zone traversed by the gaseous stream and/or this zone may contain devices adapted to ensure their division or to increase it.

More particularly, the liquid acetaldehyde may be fed to the top of a tower, with or without packing, which is traversed upwardly by the gaseous stream.

The zone in which the gaseous stream is contacted with the liquid acetaldehyde and becomes laden with vapors thereof will be termed hereinafter "saturator."

The gaseous stream coming from the reactor to be recycled to the reaction vessel may be cooled to suitable temperature before being contacted with the liquid acetaldehyde.

Alternatively, it is possible to mix with the gaseous stream only a part of the acetaldehyde to be converted, the remainder being introduced in liquid condition directly into the reactor.

In the accompanying drawing forming part of this application the figure shows a flow sheet of the steps of the process.

The liquid reaction bath is contained in a vessel, reactor 1, provided in its bottom part with a gas-dispersing device, for example a porous plate 1a, for dispersing the oxygen-containing gas throughout the bath. The oxygen-containing gas, laden with acetaldehyde vapors, is introduced by pipe 3. The gaseous stream leaving reactor 1 passes through water-cooled condenser 6 from which it flows off by pipe 6b to enter column 7, the saturator, filled with Raschig rings and fed at its top with liquid acetaldehyde by pipe 2. The liquids which flow off from the base of saturator 7 by pipe 7a and from condenser 6 by pipe 6a are collected together in pipe 7b. This liquid mixture of reaction products and unconverted acetaldehyde is sent by pipe 7b to a distillation unit (not shown). The gaseous stream leaving saturator 7 by pipe 8 is laden with acetaldehyde vapors. A part of the gaseous stream is drawn off by pipe 9, the acetaldehyde contained therein is recovered by washing the gases and distillation of the washing liquid in accordance with conventional methods, and the residual gases are discarded. Fresh oxygen-containing gas, such as air, is fed by pipe 10 and the mixture of recycled acetaldehyde-containing gaseous stream and fresh oxygen-containing gas is sent to reactor 1 by means of fan 11. The acetaldehyde vapors contained in the gaseous mixture dissolved in the reaction bath. The acetaldehyde is oxidized therein in liquid phase in the presence of metal acetates acting as catalyst.

The following Examples 1 and 2 show results obtained without the use of the present invention. Example 3 shows the process as I now prefer to practice it. It is to be understood that this example is purely illustrative, and that the invention is not to be considered as restricted thereto except as indicated in the appended claims.

Example 1

One starts the operation with a reaction bath having a volume of 2000 liters and containing the following ingredients in the proportions mentioned:

| | Percent |
|---|---|
| Acetic anhydride | 65 |
| Acetic acid | 30 |
| Acetaldehyde | 5 |

There is added to this bath, as a catalyst:

| | Percent |
|---|---|
| Cobalt acetate | 0.1 |
| Copper acetate | 0.2 |

Air is fed into the bath through the porous plate 1a through pipe 3. This air is part of a gas-vapor mixture of acetaldehyde and residual and fresh air. The total gas throughput is 4.25 cubic meters per hour per liter of reaction bath. The fresh air feed is 0.5 cubic meter per hour per liter of reaction bath. The acetaldehyde feed is about 600 grams per hour per liter of reaction bath. The oxidation temperature is approximately 55° C. In the gas-vapor cycle, only the water-cooled condenser 6 was inserted. No saturator 7 was employed.

Under such conditions the composition of the reaction bath at the equilibrium was as follows:

| | Percent |
|---|---|
| Acetic anhydride | 71.2 |
| Acetic acid | 22.6 |
| Water | 0.75 |
| Acetaldehyde | 5.15 |
| Cobalt acetate | 0.1 |
| Copper acetate | 0.2 |

There is removed from the bath a gas-vapor mixture which is constituted approximately as follows:

Gas mixture (by volume):

| | Percent |
|---|---|
| Oxygen | 8 |
| Carbon dioxide | 0.6 |
| Nitrogen | 91.4 |

Vapors carried by each cubic meter of the gas-vapor mixture:

| | Grams |
|---|---|
| Acetic anhydride | 164 |
| Acetic acid | 103.5 |
| Water | 41.5 |
| Acetaldehyde | 527 |

The water-cooled condenser produced a condensate at the base which was drawn off and the anhydride content determined. The gas-vapor mixture drawn off from this condenser was then supplied with fresh air after discarding of a portion thereof, and recycled, and additional liquid acetaldehyde was introduced into the reactor 1. The results were an acetic anhydride yield of 60%. The temperature at the outlet of the water-cooled condenser was 25° C.

It is clear that a high proportion of acetic anhydride cannot be obtained where the cooling by the water-cooled condenser is only to 25° C. As previously stated, it is necessary to cool the gaseous mixture to a temperature not substantially above 10° C., as shown in Example 2 below. Without such cooling a yield of only 60% of acetic anhydride is obtained, as hereinabove shown in this example, whereas in Example 2, with brine cooling a yield of 79% is obtained.

Example 2

This example was carried out in the same manner as Example 1. In addition to the water-cooled condenser a brine-cooled condenser was inserted in the cycle, but no saturator 7 was employed. The results were as follows:

| | ° C. |
|---|---|
| Temperature at the outlet of the water-cooled condenser | 25 |
| Temperature at the outlet of the brine-cooled condenser | 10 |

Composition of the reaction bath at the equilibrium:

| | Percent |
|---|---|
| Acetic anhydride | 84.2 |
| Acetic acid | 10.1 |
| Water | 0.7 |
| Acetaldehyde | 4.7 |
| Cobalt acetate | 0.1 |
| Copper acetate | 0.2 |

Composition of the gas-vapor mixture leaving the bath:

Gas mixture (by volume):

| | Percent |
|---|---|
| Oxygen | 7.8 |
| Carbon dioxide | 0.6 |
| Nitrogen | 91.6 |

Vapors carried by each cubic meter of the gas-vapor mixture:

| | | |
|---|---|---|
| Acetic anhydride | grams | 145 |
| Acetic acid | do | 40 |
| Water | do | 23 |
| Acetaldehyde | do | 544 |
| Acetic anhydride yield | percent | 79 |

The brine-cooled condenser removed 275 calories per kg. of anhydride with resulting expense.

Example 3

In the cycle there was inserted the condenser 6 and saturator 7 as employed in accordance with this invention, the remainder of the process being carried out as in Example 1. The whole of the acetaldehyde was fed to the system through pipe 2. The results were as follows:

| | ° C. |
|---|---|
| Temperature at the outlet of the water-cooled condenser | 25 |
| Temperature at the outlet of the saturator | −8 |

Composition of the reaction bath at the equilibrium:

| | Percent |
|---|---|
| Acetic anhydride | 85.3 |
| Acetic acid | 10.6 |
| Water | 0.3 |
| Acetaldehyde | 3.5 |
| Cobalt acetate | 0.1 |
| Copper acetate | 0.2 |

Composition of the gas-vapor mixture leaving the bath:

Gas mixture (by volume):

| | Percent |
|---|---|
| Oxygen | 7.8 |
| Carbon dioxide | 0.6 |
| Nitrogen | 91.6 |

Vapors carried by each cubic meter of the gas-vapor mixture:

| | | |
|---|---|---|
| Acetic anhydride | grams | 156 |
| Acetic acid | do | 36 |
| Water | do | 16.6 |
| Acetaldehyde | do | 360 |
| Acetic anhydride yield | percent | 79.5 |

No cooling expense for removal of calories.

Thus, the use of a saturator in accordance with this invention results in noticeable saving of expense for removal of calories, the saving being the more considerable the higher the temperature of the cooling water available is. No brine condenser is used.

As aforesaid, it is within the scope of the invention to vaporize in the saturator only a part of the acetaldehyde to be oxidized, the remainder being introduced in liquid condition into the reactor through pipe 2a. By so operating, one may control at the desired value the temperature of the saturator.

The invention may advantageously be applied to the case where the gaseous stream leaving the reactor is subjected, in accordance with French patent application No. PV 813,121, dated December 15, 1959, to partial condensation in a dephlegmator, with reflux of the condensate to the reaction bath to maintain constant the volume of said bath. Said French application corresponds to U.S. application Ser. No. 75,530, filed December 13, 1960.

The present invention may thus be carried out in various ways, for example:

(a) Use of dephlegmator, as aforesaid+condenser 6+saturator 7
(b) Use of dephlegmator+saturator 7 (without condenser)
(c) Use of condenser 6+saturator 7 (in accordance with the annexed drawing)
(d) Use of saturator 7 only, directly receiving the gaseous stream that leaves the reactor.

I claim:

1. In the process of producing acetic anhydride by the catalytic oxidation of acetaldehyde by molecular oxygen in a liquid reaction medium containing acetic anhydride and acetic acid with the liberation of a gaseous mixture from said liquid reaction medium, the improvement which comprises so directly contacting said gaseous mixture with liquid acetaldehyde as to condense acetic anhydride and acetic acid from said gaseous mixture and to enrich said gaseous mixture with acetaldehyde, and introducing at least a portion of the so enriched gaseous mixture to the aforesaid reaction medium.

2. A process as set forth in claim 1 wherein liquid acetaldehyde is sprayed into the gaseous mixture from the liquid reaction medium.

3. A process as set forth in claim 1 wherein the direct contact between the gaseous mixture from the reaction medium and liquid acetaldehyde is effected by passing liquid acetaldehyde and the gaseous mixture countercurrently through a confined zone containing solid liquid-dispersing media.

4. In the process of producing acetic anhydride by the catalytic oxidation of acetaldehyde by oxygen of the air in a liquid reaction medium containing acetic anhydride and acetic acid with the liberation of a gaseous mixture from the liquid reaction medium which gaseous mixture is partially condensed by indirect heat exchange, the improvement which comprises so directly contacting the uncondensed gaseous mixture with liquid acetaldehyde as to condense further acetic anhydride and acetic acid therefrom and to enrich said uncondensed gaseous mixture with acetaldehyde, and introducing at least a portion of the so enriched gaseous mixture and air to the aforesaid reaction medium.

References Cited in the file of this patent
UNITED STATES PATENTS

| | | |
|---|---|---|
| 2,514,041 | Elce et al. | July 4, 1950 |
| 2,575,159 | Chassaing et al. | Nov. 13, 1951 |
| 2,658,914 | Rigon | June 28, 1953 |